United States Patent [19]

Umezono et al.

[11] Patent Number: 4,998,385
[45] Date of Patent: Mar. 12, 1991

[54] METHOD OF MODIFIED GEAR CUTTING OF A GLOBOID WORM GEAR

[75] Inventors: Shiro Umezono; Minoru Maki, both of Yokohama, Japan

[73] Assignee: Nippon Gear Co., Ltd., Tokyo, Japan

[21] Appl. No.: 423,647

[22] Filed: Oct. 19, 1989

Related U.S. Application Data

[63] Continuation of Ser. No. 140,088, Dec. 31, 1987, abandoned.

[30] Foreign Application Priority Data

Sep. 22, 1987 [JP] Japan .................. 62-236356

[51] Int. Cl.$^5$ .............................................. B23F 11/00
[52] U.S. Cl. ........................................ 51/287; 409/12
[58] Field of Search .......... 51/287, 105 GG, 105 HB, 51/95 GA, 52 R, 325; 409/12, 48, 60

[56] References Cited

U.S. PATENT DOCUMENTS

| | | | |
|---|---|---|---|
| 1,934,254 | 11/1933 | Wildhaber | 51/52 R |
| 3,045,557 | 7/1962 | Yamato | 409/48 |
| 3,875,635 | 4/1975 | Povlov | 409/48 |
| 3,916,569 | 11/1975 | Wydler | 51/287 |
| 4,184,796 | 1/1980 | Sakai | 409/12 |
| 4,475,319 | 10/1984 | Wirz | 409/12 |

OTHER PUBLICATIONS

Sakai, Takao, "An Investigation on Secondary Action on Skew Gears", Journal of Engineering for Industry, Feb. 1974, pp. 25-32.

Primary Examiner—Frederick R. Schmidt
Assistant Examiner—Blynn Shideler
Attorney, Agent, or Firm—Michael A. Painter

[57] ABSTRACT

A method of modified gear cutting of a globoid worm gear. A worm wheel gear cutting tool employs a conical cutting surface which is substantially the same as the conical surfaces of the teeth of a cooperating globoid worm wheel. The worm wheel is the reciprocal image of the conical cutting surface of the tool. A worm gear is cut by imparting to the cutting tool a motion defined both by the distance between the axis of the worm gear to be cut and the axis of rotation of the cutting tool as well as the speed reduction ratio which constitutes the ratio of the speed of rotation of the cutting tool to the speed of rotation of the worm gear.

2 Claims, 4 Drawing Sheets

METHOD OF MODIFIED GEAR CUTTING OF A GLOBOID WORM GEAR

This is a continuation of application Ser. No. 140,088, filed Dec. 31, 1987, now abandoned.

BACKGROUND OF THE INVENTION

1. Field of the Invention

This invention relates to a method of generating globoid worm gears and worm wheels and, more particularly, to an improved method of cutting a globoid worm gear having a conical intervening gear tooth surface.

2. Prior Art

A globoid worm gear pertaining to the invention is based upon the principles disclosed in the treatise entitled "A Study on Hourglass Worm Gearing with Envelopable Tooth Surfaces" whose authors included the inventors of the present invention and which was published in the "Transactions of the American Society of Mechanical Engineers," Volume 100, Journal of Mechanical Design, pages 451–459 (1978).

While the devices taught by the prior art are in actual use, the inclination angle of the intervening gear axes is zero. This corresponds to the application of a conical surface in lieu of a straight line for the gear surface of a revolving worm gear cutting tool for a classical Hindley globoid worm gear.

FIG. 4 illustrates the principles presented in "An Investigation on Secondary Action on Skew Gears" authored by the present inventors, and published in Transactions of the Japan Society of Mechanical Engineers. Vol. 38, No. 311, 1972. In a conventional Hindley globoid worm gear, a satisfactory mesh terminates at a point on a common axis or line which is perpendicular to both gear axes at a limit normal line point and at an edge line B in the central part of a worm wheel A. Based on the principles taught in "An Investigation on Secondary Action on Skew Gears," the edge line B is defined by the appearance of the straight cutting edge in the worm gear cutting tool and defines the first gear surface.

A second gear surface D (commonly called an envelope surface) has a relatively small radius of curvature and effects satisfactory engagement. Second gear surface D appears in the central part of the worm wheel A adjacent the edge line B. On the opposite side of the second gear surface D, there is an imaginary gear surface, which is produced theoretically on the inner side of the worm (i.e., inner side in the thickness direction of the tooth portion). This gear surface is a curved surface and is a trace of the motion of the cutting surface of a tool representing the worm wheel.

The prior art discloses the generation of globoid worm gears by replacing the straight tool used for cutting the classical Hindley globoid worm gears with a tool having a conical cutting surface. As shown in FIG. 5a, the tooth surface G of the worm wheel A is an envelope for second tooth surface D' of conical tool F, both being adjacent to each other within the boundary defined by the central edge line B of the Hindley globoid worm gear.

On the wheel tooth surface shown in FIG. 5b, the mesh is represented by first contact lines $1H_1$, $1H_2$..., second contact lines $2H_1$, $2H_2$..., etc. As shown in FIG. 6, the orbital surfaces $1I$ and $2I$ intermediate the contact lines intersect along a limit normal point curve J. A pair of contact lines are simultaneously in contact with a surface of a tooth of the worm wheel.

The point P of intersection between the orbital trace surfaces $1I$ and $2I$ lies along an axis $Z_3$ which is perpendicular to the wheel axis $Z_1$ and worm axis $Z_2$ and can be taken as a reference of the worm gear design. This means that no real first and second contact lines are obtained in a region close to the worm axis $Z_2$ beyond point P. Therefore, the limit normal point curve J of the classical Hindley globoid worm gear conicides with a single axis $Z_3$ perpendicular to the two gear axes. In this case, therefore, satisfactory engagement can be obtained only along one-half of the width of the worm tooth.

A globoid worm gear having a conical intervening gear tooth surface is theoretically the same as the classical Hindley globoid worm gear. On the other hand, discontinuities on the worm wheel tooth surface resulting from the limit normal point curve preclude full engagement in the region beyond the limit normal line point.

A modified method for generating the Hindley globoid worm gear is based on the use of a straight cutting edge and is intended to avoid the inherent problems described above. As shown in FIG. 7, the method performs the gear cutting procedure in three steps by setting different centers $0_1$, $0_0$ and $0_2$ for the revolution of a gear cutting tool K. This method results in trace surfaces for the first and second contact lines which correspond to the individual centers $0_0$, $0_1$ and $0_2$, each having the limit normal point curve spaced from the axis of the worm wheel at each end of the meshed worm gear.

The modified gear generating method which is described hereinabove is based upon the use of a tool employing a straight cutting edge. However, since three different centers of revolution of the tool are used, the number of machining steps is correspondingly increased. The number of machining steps is further increased since it is necessary to separately machine the front tooth and back tooth, i.e., the front tooth surface is generated when it is in contact with the tool and the worm is turned forwards, the back tooth surface being generated when it is in contact with the tool and worm is turned backwards. Further, the setting of the center of revolution of the tool requires considerable time and skill. Further, the individual trace surfaces corresponding to the centers $0_0$, $0_1$ and $0_2$, respectively, of the contact lines are discontinuous between the adjacent machining steps.

SUMMARY OF THE INVENTION

The present invention employs a worm gear cutting tool which, in whole or in part, is substantially the same as the cooperating worm wheel which is produced by using the conical surface as the tool cutting surface. The conical cutting surface of the tool is rotated at a speed which is substantially equivalent to that given to the worm wheel. A worm wheel is generated using the worm gear cutting tool by imparting to the conical cutting surface of the tool a motion defined by the axis-to-axis distance between the worm gear and the cutting tool and a speed reduction ratio which is slightly greater than parameters employed at the time of the production of the worm wheel gear cutting tool. According to the present invention, trace surfaces are formed which are equivalent to the trace surfaces of the first and second contact lines formed by Hindley's modified gear cutting method.

DESCRIPTION OF THE PRESENTLY PREFERRED EMBODIMENT

The present invention method is a modified gear cutting process to be used to form Hindley globoid worm gears. The invention employs a worm gear cutting tool having a conical cutting surface, thereby obtaining equivalent contact line surfaces in order to improve tooth engagement.

Figure 1:
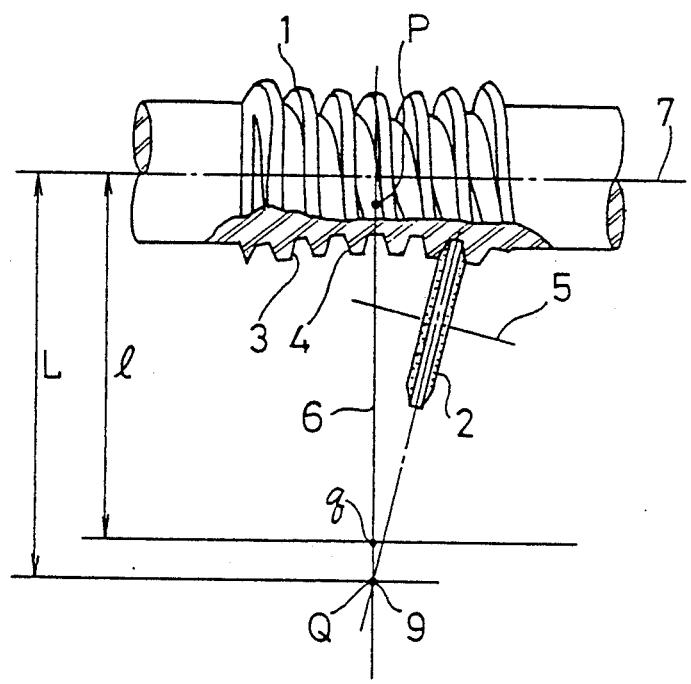
FIG. 1 is a schematic view illustrating the positional relationship between an exemplary worm gear and the conical cutting surface of the cutting tool in accordance with the present invention.
Figure 2:
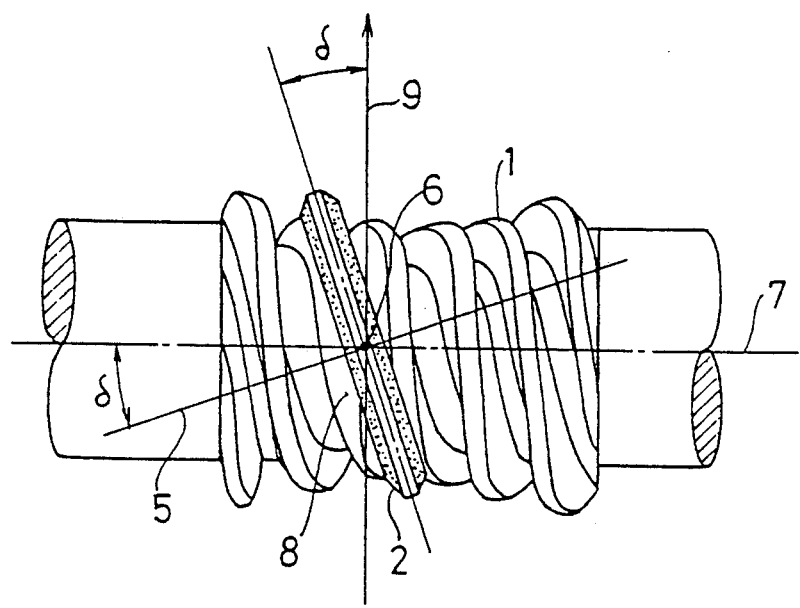
FIG. 2 is a schematic view illustrating the positional relationship between the conical cutting surface of the tool and an exemplary worm gear positioned in alignment along an axis determined in accordance with the present invention.
Figure 3:
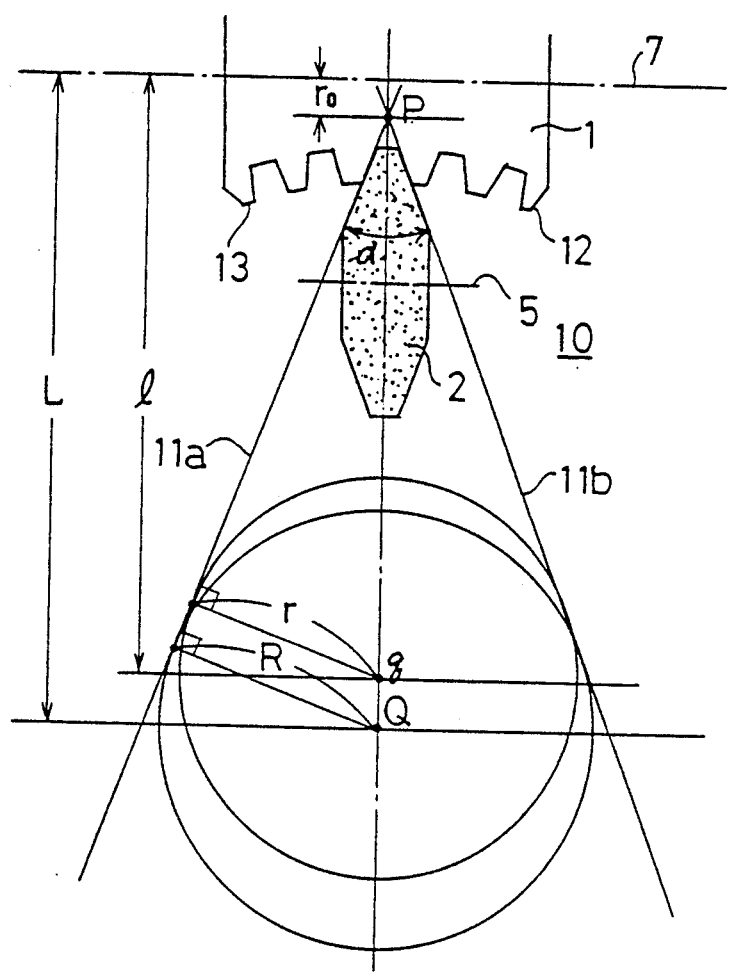
FIG. 3 is a schematic view illustrating the positional relationship between an exemplary worm gear and the cutting tool required to set the axis-to-axis distance at the time of machining.
Figure 4:
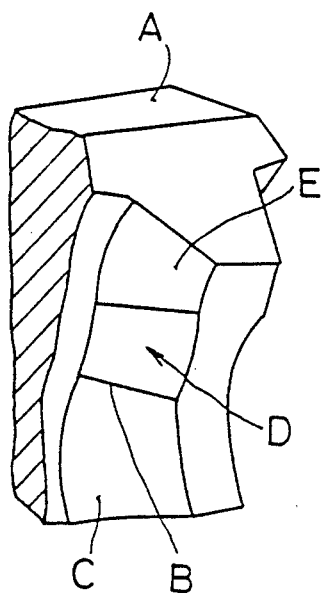
FIG. 4 is a partial cross-sectional view of worm wheel tooth surfaces generated in accordance with the secondary contact theory.
Figure 5A:
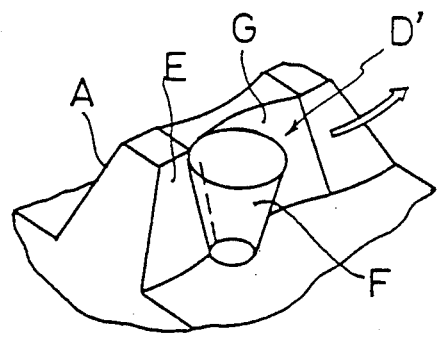
FIG. 5a is a perspective, partial cross-sectional view of a tooth surface structure of a worm wheel cut with a tool employing a conical cutting surface.
Figure 5B:
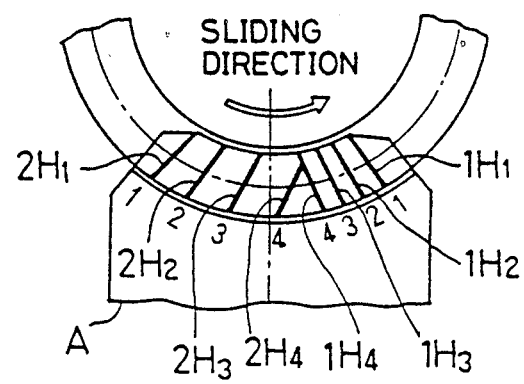
FIG. 5b is a schematic view taken in the direction of a worm wheel axis illustrating the engagement between a worm wheel having the tooth surface shown in FIGS. 5a and a worm gear.
Figure 6:
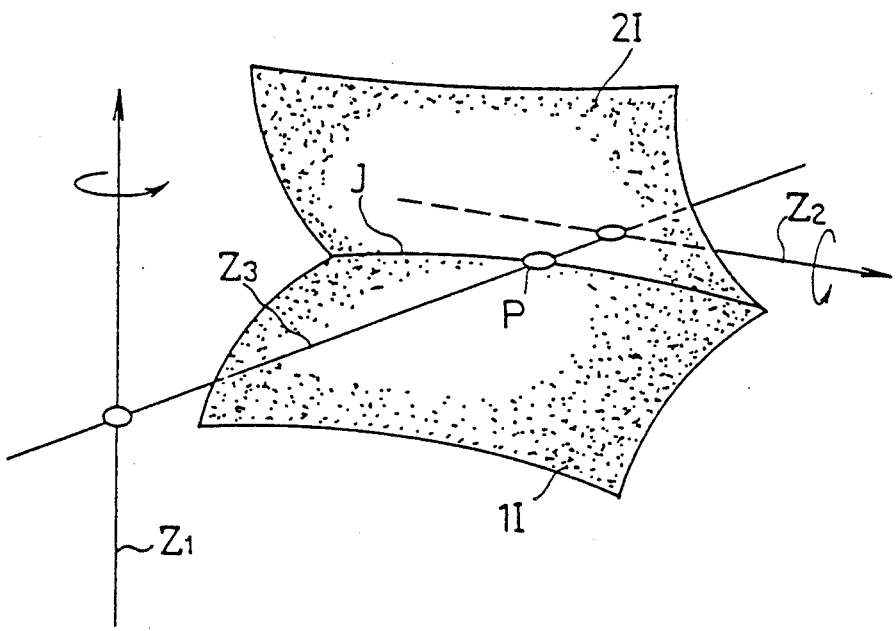
FIG. 6 is a schematic, perspective view showing an arrangement of trace surfaces of first and second contact lines of a worm gear based on the secondary contact theory.
Figure 7:
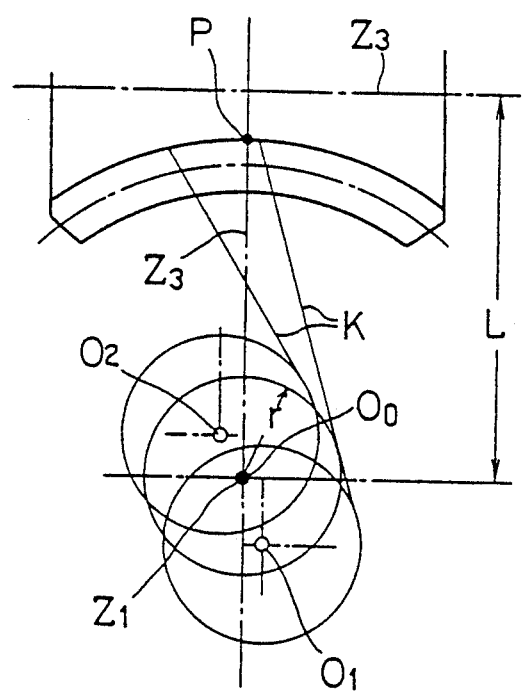
FIG. 7 is a schematic view showing the positional relationship between a straight edged cutting tool used for a prior art modified gear cutting process and a workpiece worm gear.

The present invention can be best understood by reference to FIGS. 1, 2 and 3 which collectively illustrate the steps of the improved method for cutting globoid worm gears. Front and back tooth surfaces 3 and 4 of worm gear 1 are simultaneously cut through the use of a conical cutting surface tool 2 revolving about a center of rotation Q.

The ratio between the rate of rotation of cutting tool 2 about the center of rotation Q and that of worm gear 1 about its axis 7 is expressed as the gear cutting speed reduction ratio j which is equivalent to the worm gear speed reduction ratio. The distance between the axis 7 of the worm gear 1 and the center of rotation Q (i.e., the axis 9) is designated by the reference L. The center of rotation q occurs when the worm gear 1 is engaged with a worm wheel (not shown) which is located at the center of revolution of the cutting tool 2 when producing a worm wheel gear cutting hob. The distance between the axis 7 of the worm gear 1 and the center or rotation q is defined by the reference "l", the speed reduction ratio being defined as i. The worm wheel is produced with a hob of a worm wheel gear cutting tool having substantially the same shape (in whole or in part) as the worm wheel. The globoid wheel is formed by incorporating all or part of the conical surface as the tool's cutting surface and imparting to the conical cutting tool motion which is substantially the same as that of the worm wheel.

When generating the globoid worm gear, the aforementioned axis-to-axis distance L and gear cutting speed reduction ratio j are both increased to a value which is slightly greater than the axis-to-axis distance l and speed reduction ratio i used at the time of the production of the tool hob. As shown in FIG. 2, the present invention methods permits the generation of a worm gear having predetermined characteristics by precessing the axis of rotation 5 of the cutting tool 2 by a lead angle δ. The angle is measured with respect to the worm gear axis 7 at a reference point P lying on a common line 6 which is perpendicular to the two gear axes shown in FIG. 2 (i.e., perpendicular to the plane of the drawing).

FIG. 3 schematically illustrates the principles of cutting a gear lying in a plane 10 which contains worm gear axis 7 and common perpendicular line 6, both being perpendicular to the worm wheel axis 9. FIG. 3 illustrates a state in which the axis of rotation 5 of the cutting tool 2 is perpendicular to the common line 6 perpendicular to the two gear axes.

The conical surface lines and the conical cutting tool 2 lie within plane 10 and are schematically represented as straight lines, the extensions thereof being designated by reference numerals 11a and 11b. The worm in the globoid worm gear described in U.S. Pat. No. 4,184,796 is generated by a rotating conical cutting tool about the center of rotation q at a gear cutting speed reduction ratio j which is equal to the worm speed reduction ratio i. In accordance with the present invention method, the worm gear is cut by increasing both the speed reduction ratio and axis-to-axis distance from the initial values (i.e., i<j and l<L) for the same conical surface tool 2. At this time, the lengths r and R of the lines perpendicular to the extensions 11a and 11b measured from the centers of rotation q and Q, respectively, correspond to the ratio of the basic circles in a Hindley worm gear.

To determine the gear cutting speed reduction ratio j and axis-to-axis distance L for cutting a worm gear, the limit normal line point on the common perpendicular line 6 is taken as the design reference point P. Based upon gear generating theory, in a worm gear having two perpendicular axes, the point of contact between the tooth surfaces along the common perpendicular line is defined as the limit normal line point. Therefore, if the motion of the tooth surface of the cutting tool 2 corresponds to the relative motion of the worm wheel at a given point along the common perpendicular line 6, the present invention method allows point P to pass the limit normal line point which would otherwise limits engagement. By so doing, the range of engagement, i.e., the number of engaged teeth, can be controlled during the stage of design. The point P is located at a distance $r_0$ from the worm gear axis 7 (FIG. 3).

As shown in FIG. 2, the lead angle of engagement represents the relative angular position when the worm gear cutting tool and the worm wheel are engaged with one another and is designated by the symbol δ. Therefore:

$$\tan\delta = \frac{l - r_0}{r_0 \cdot i}$$

The initial angle at the time of the gear cutting is denoted by the symbol δ', and therefore:

$$\tan\delta' = \frac{L - r_0}{r_0 \cdot j}$$

Where the two angles $\delta$ and $\delta'$ coincide with one another:

$$\frac{L - r_0}{r_0 \cdot j} \leq \frac{l - r_0}{r_0 \cdot i}$$

The axis-to-axis distance L is:

$$L = \frac{j(l - r_0)}{i} + r_0$$

The axis-to-axis distance L may be calculated as $j = i + n$, where j is the gear cutting speed reduction ratio and n is any positive integer (i.e., 1, 2, 3, ... n). The speed reduction ratio i of the worm gear corresponds to the number of teeth of the worm wheel where a single worm is used.

As has been described, according to the present invention method, one can obtain at the inlet and outlet of the worm an escape equivalent to the prior art. In addition, the present invention allows the formation of continuous trace surfaces of the first and second contact lines, and a substantial improvement over the discontinuities occurring with the modified gear cutting methods described in the prior art. Further, the front and back surfaces of the gear teeth can be generated in a single step thereby increasing the efficiency of the manufacturing process.

We claim:

1. A method of cutting a globoid worm gear adapted to engage the toothed surface of a cooperatively associated worm wheel comprising the steps of:
   (a) providing a worm wheel gear cutting tool having conical cutting surfaces formed thereon, the profile thereof being substantially the same as the surfaces of the globoid worm wheel;
   (b) rotating the conical cutting surfaces of the worm wheel gear cutting tool at a rate proportional to that applied to the globoid worm gear;
   (c) cutting the tooth surfaces of a worm wheel with the worm wheel gear cutting tool and forming a reciprocal image therein of the conical cutting surface of said cutting tool; and
   (d) cutting the globoid worm gear by imparting to the conical cutting surfaces of the cutting tool a motion defined by a lead angle of engagement determined from (i) the distance between the axis of the worm gear and the center of rotation of the cutting tool, and (ii) the ratio between the rate of rotation of the cutting tool and the rate of rotation of the worm gear, both of which are increased from the values used to generate the conical cutting surfaces of the cutting tool.

2. The method of modified gear cutting of a globoid worm gear as defined in claim 1 wherein the step of cutting the globoid worm gear is carried out by precessing the axis of rotation of the conical cutting surfaces of said cutting tool to an angle which maintains engagement between the tooth surface of said worm wheel and said globoid worm gear at the limit normal line point on a single axis which is perpendicular to the axes of rotation of the globoid worm gear and the worm wheel.

* * * * *